(12) United States Patent
Zhang et al.

(10) Patent No.: US 10,460,231 B2
(45) Date of Patent: Oct. 29, 2019

(54) METHOD AND APPARATUS OF NEURAL NETWORK BASED IMAGE SIGNAL PROCESSOR

(71) Applicants: Qiang Zhang, Pasadena, CA (US); Zhengping Ji, Temple City, CA (US); Yibing Michelle Wang, Temple City, CA (US); Ilia Ovsiannikov, Studio City, CA (US)

(72) Inventors: Qiang Zhang, Pasadena, CA (US); Zhengping Ji, Temple City, CA (US); Yibing Michelle Wang, Temple City, CA (US); Ilia Ovsiannikov, Studio City, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 15/075,076

(22) Filed: Mar. 18, 2016

(65) Prior Publication Data
US 2017/0185871 A1 Jun. 29, 2017

Related U.S. Application Data

(60) Provisional application No. 62/272,653, filed on Dec. 29, 2015.

(51) Int. Cl.
*G06N 3/04* (2006.01)
*G06N 3/08* (2006.01)
*G06K 9/00* (2006.01)
*G06K 9/46* (2006.01)
*G06K 9/62* (2006.01)

(52) U.S. Cl.
CPC ....... *G06N 3/0454* (2013.01); *G06K 9/00624* (2013.01); *G06K 9/4628* (2013.01); *G06K 9/6271* (2013.01); *G06N 3/084* (2013.01)

(58) Field of Classification Search
None
See application file for complete search history.

(56) References Cited

U.S. PATENT DOCUMENTS

| | | | | |
|---|---|---|---|---|
| 5,376,963 A * | 12/1994 | Zortea | ................... | H04N 9/045 348/222.1 |
| 5,548,697 A * | 8/1996 | Zortea | ................... | H04N 9/646 348/650 |
| 7,103,524 B1* | 9/2006 | Teig | ................... | G06F 17/5081 703/14 |
| 7,660,437 B2* | 2/2010 | Breed | ............... | G06K 9/00369 382/100 |

(Continued)

OTHER PUBLICATIONS

A. Dosovitskiy, J. T. Springenberg and T. Brox, "Learning to generate chairs with convolutional neural networks," 2015 IEEE Conference on Computer Vision and Pattern Recognition (CVPR), Boston, MA, Oct. 15, 2015, pp. 1538-1546.*

(Continued)

*Primary Examiner* — Andrae S Allison
(74) *Attorney, Agent, or Firm* — Renaissance IP Law Group LLP

(57) ABSTRACT

An image signal processing (ISP) system is provided. The system includes a neural network trained by inputting a set of raw data images and a correlating set of desired quality output images; the neural network including an input for receiving input image data and providing processed output; wherein the processed output includes input image data that has been adjusted for at least one image quality attribute. A method and an imaging device are disclosed.

13 Claims, 9 Drawing Sheets

(56) References Cited

U.S. PATENT DOCUMENTS

| | | | | |
|---|---|---|---|---|
| 7,890,443 | B2* | 2/2011 | Zhang | G06K 9/00288 706/45 |
| 8,010,471 | B2* | 8/2011 | Zhang | G06K 9/00288 706/12 |
| 8,965,112 | B1 | 2/2015 | Ibarz et al. | |
| 9,147,255 | B1* | 9/2015 | Zhang | G06T 7/0079 |
| 9,165,369 | B1* | 10/2015 | Zhang | G06T 7/0081 |
| 9,373,057 | B1* | 6/2016 | Erhan | G06K 9/6202 |
| 2005/0281455 | A1* | 12/2005 | Huang | G06K 9/00456 382/156 |
| 2008/0144944 | A1* | 6/2008 | Breed | G06K 9/00369 382/224 |
| 2010/0183217 | A1 | 7/2010 | Seung et al. | |
| 2011/0311129 | A1* | 12/2011 | Milanfar | G06K 9/00335 382/154 |
| 2012/0207346 | A1* | 8/2012 | Kohli | G06K 9/6211 382/103 |
| 2012/0262610 | A1 | 10/2012 | Rissa et al. | |
| 2013/0222689 | A1 | 8/2013 | Ligeti | |
| 2015/0278642 | A1* | 10/2015 | Chertok | G06N 3/02 382/156 |
| 2017/0046613 | A1* | 2/2017 | Paluri | G06N 3/0454 |

OTHER PUBLICATIONS

Zagoruyko, Sergey, and Nikos Komodakis. "Learning to compare image patches via convolutional neural networks." Proceedings of the IEEE Conference on Computer Vision and Pattern Recognition. Apr. 14, 2015.*

Yuzuguzel, Hidir. "Learning colour constancy using convolutional neural network" <https://dspace.cc.tut.fi/dpub/bitstream/handle/123456789/23583/Yuzuguzel.pdf?sequence=1&isAllowed=y>(Nov. 2015).*

Y. LeCun, L. Bottou, Y. Bengio, and H. P. Gradient-based learning applied to document recognition. Proceedings of the IEEE, 86(11):2278-2324, 1998.*

V. Jain and H. Seung. Natural image denoising with convolutional networks. Advances in Neural Information Processing Systems (NIPS), 21:769-776, 2008.*

Burger, Harold C., Christian J. Schuler, and Stefan Harmeling. "Image denoising: Can plain neural networks compete with BM3D?." Computer Vision and Pattern Recognition (CVPR), 2012 IEEE Conference on. IEEE, 2012.*

Narnaware et al, Image Enhancement using Artificial Neural Network and Fuzzy Logic, IEEE Sponsored 2nd International Conference on Innovations in Information Embedded and Communication Systems ICIIECS'15.*

Tao, Li, et al. "Low-light image enhancement using CNN and bright channel prior." Image Processing (ICIP), 2017 IEEE International Conference on. IEEE, 2017.*

A.P.A. de Castro, A Multiscale Neural Network Method for Image Restoration, TEMA Tend. Mat. Apl. Comput., 9, No. 1 (2008), 41-50. (Year: 2008).*

* cited by examiner

METHOD AND APPARATUS OF NEURAL NETWORK BASED IMAGE SIGNAL PROCESSOR

BACKGROUND

1. Field

The invention disclosed herein relates to neural networks, and in particular, to techniques for using a neural network to perform image signal processing.

2. Description of the Related Art

The wide availability of imaging sensors has permitted manufacturers to include imaging capabilities in many devices. For example, it is hard to find a cellular telephone that does not include a digital camera. While the manufacturing costs for imaging sensors have been greatly reduced, and the technology for imaging has greatly improved, image signal processing remains a challenge.

Typically, image signal processing has required dedicated components configured for a particular imaging sensor. Development of a specialized image signal processor can be very costly. For example, a substantial amount of computer code must be written for processing images. Writing such code involves a lot of expertise to perform design and tuning of the processing. Further, such code must be tailored to individual sensors, and may need to be customized for a given user. To complicate matters further, such code does not account for manufacturing variability in a group of imaging sensors as may arise in the manufacturing process.

Aside from increased manufacturing cost and complexity, a given chipset dedicated to image signal processing can be relatively inflexible and not well suited to all environments. Accordingly, the greater the image signal processing capability included in an imaging device, the greater the associated cost and space required within the device.

What are needed are improved techniques for more effectively providing image signal processing. The techniques should make use of common resources such as a multipurpose processor and memory. Preferably, the techniques should be highly flexible such that they may be easily improved upon.

SUMMARY

In one embodiment, an image signal processing (ISP) system is provided. The system includes a neural network trained by inputting a set of raw data images and a correlating set of desired quality output images; the neural network including an input for receiving input image data and providing processed output; wherein the processed output includes input image data that has been adjusted for at least one image quality attribute.

The neural network may include a convolutional neural network. The neural network may be trained by a back-propagation technique. The neural network may be configured for being downloaded to a mobile imaging device. The at least one image quality attribute may include image size, aspect ratio, brightness, intensity, bit depth, white value, dynamic range, gray level, contouring, smoothing, speckle, color space values, interleaving, correction, gamma correction, edge enhancement, contrast enhancement, sharpness and demosaicing.

In another embodiment, a method for providing an image signal processing (ISP) system is provided. The method includes configuring a neural network for image processing; training the neural network with a set of raw data images and a set of desired quality output images, wherein an image in each raw data image correlates to an image in the set of desired quality output images; and, configuring the trained neural network to receive input image data and provide processed output data wherein the processed output includes input image data that has been adjusted for at least one image quality attribute.

The method may further include training the neural network by back-propagation. The method may further include collecting the set of raw image data with an imaging device. The method may further include processing the set of raw image data to provide a set of conventionally processed image data to be used as the set of desired quality output images. The method may further include collecting the set of desired quality output images with a reference imaging device. The method may further include attribute reference data with at least some of the desired quality output images. The training may be performed on a remote system and configuring the trained neural network includes downloading the neural network to an imaging device. The at least one image quality attribute may include image size, aspect ratio, brightness, intensity, bit depth, white value, dynamic range, gray level, contouring, smoothing, speckle, color space values, interleaving, correction, gamma correction, edge enhancement, contrast enhancement, sharpness and demosaicing.

In yet another embodiment, an imaging device is provided. The device includes an imaging sensor, a processor and memory; and an image signal processing (ISP) system including machine executable instructions stored on non-transient machine readable media, the instructions including a neural network trained by inputting a set of raw data images and a correlating set of desired quality output images; the neural network including an input for receiving input image data from the imaging sensor and providing processed output; wherein the processed output includes input image data that has been adjusted for at least one image quality attribute.

The imaging device may include one of a smartphone, a tablet computer, a camera and a medical imaging device. The image signal processing (ISP) system may be provided as one of a complement to a conventional image signal processing system and in place of the conventional image signal processing system. The imaging device may be further configured for communicating with a remote system to distribute computing tasks between the imaging device and the remote system. The imaging device may be further configured for periodic retraining. The imaging device may be further configured for one of general purpose imaging, medical imaging, security imaging and production imaging. Training may be performed by back-propagation.

The imaging device may be reconfigured to update the image signal processing system. The reconfiguration may be done via communicating with a remote system automatically, for example, according to the geography of the device. The reconfiguration may be done by communicating with a remote system according to the customer's preference.

BRIEF DESCRIPTION OF THE DRAWINGS

The features and advantages of the disclosure are apparent from the following description taken in conjunction with the accompanying drawings in which:

FIG. 7A, FIG. 7B, FIG. 7C and FIG. 7D collectively referred to herein as FIG. 7, are representations of a set of graphic images, wherein FIG. 7A depicts an input image; FIG. 7B depicts a reference image; FIG. 7C depicts output of a state of the art image signal processor; and FIG. 7D depicts output of a neural network configured for image signal processing;

FIG. 8A, FIG. 8B, FIG. 8C and FIG. 8D collectively referred to herein as FIG. 8, are representations of another set of graphic images, wherein FIG. 8A depicts an input image; FIG. 8B depicts a reference image; FIG. 8C depicts output of a state of the art image signal processor; and FIG. 78 depicts output of a neural network configured for image signal processing; and, FIG. 9A and FIG. 9B, collectively referred to herein as FIG. 9, are representations of enlarged views of a portion of the another set of graphic images (FIG. 8), wherein

DETAILED DESCRIPTION

Figure 1:
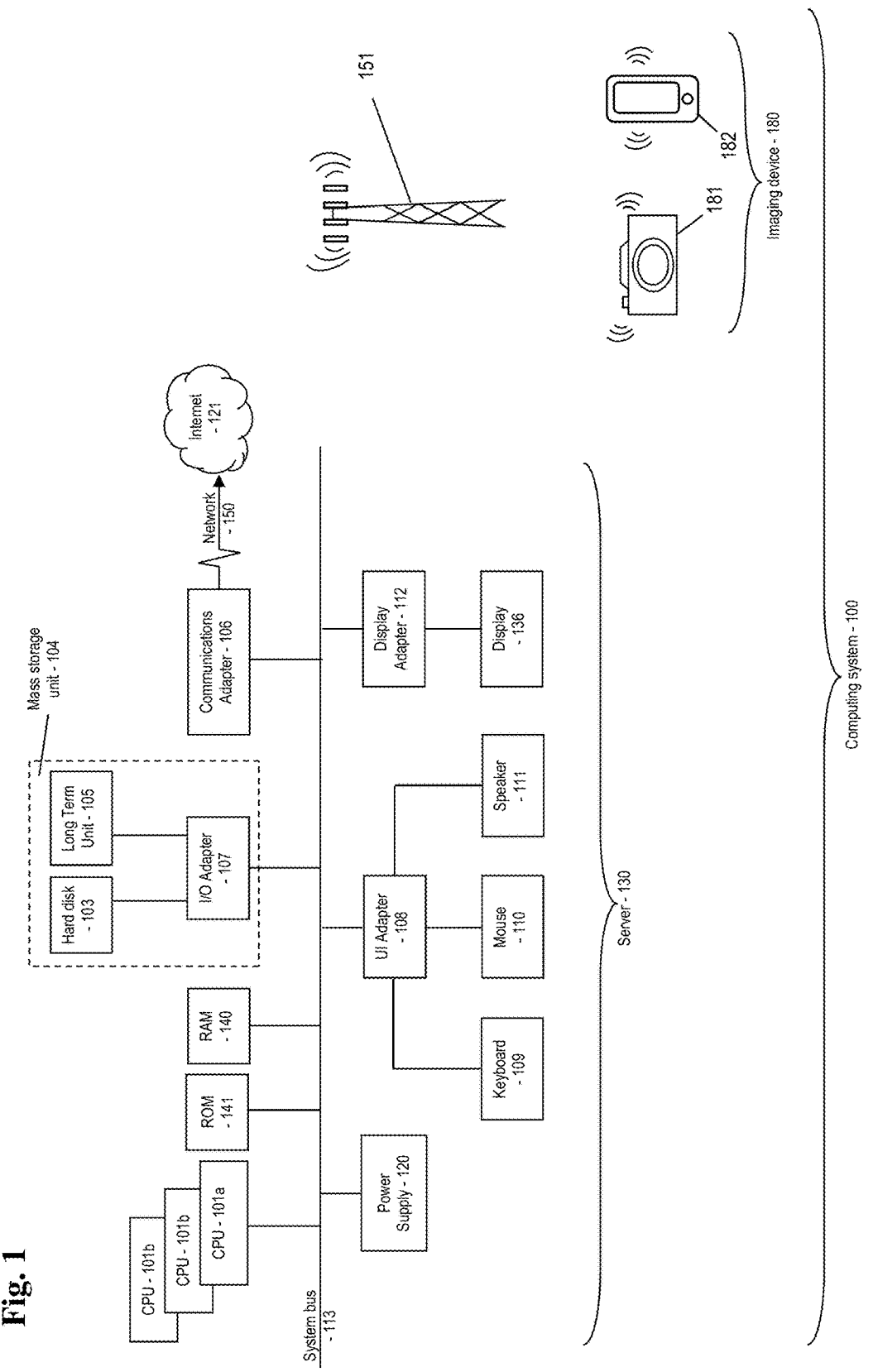
FIG. 1 is a block diagram of computing resources suited for implementing embodiments of neural networks as disclosed herein.

Disclosed herein are techniques for using a neural network to perform image signal processing (ISP). The techniques may provide for high quality image signal processing (ISP) that takes advantage of multipurpose components such as the central processing unit (CPU), memory, communications capabilities and other components is commonly found within many electronic devices. For example, the techniques may take advantage of multipurpose components commonly found within a cellular telephone, or low end, consumer oriented digital camera.

As an overview, embodiments of the technique generally make use of a neural network to perform image signal processing (ISP). Embodiments provide for efficient learning of the neural network and optimization of output images.

The neural networks trained according to the teachings herein may be used for a variety of computationally complicated tasks associated with image signal processing. For example, the neural network may be used for processing images used for object recognition. Object recognition may provide for facial recognition, handwriting analysis, medical image analysis, and other tasks requiring analysis of images to identify objects and features therein, and for a variety of similar tasks. The processed images may be used for a variety of tasks such as environmental surveillance, to control production and manufacturing, to assist with medical diagnostics, and a variety of other similar processes.

In order to provide some context for the teachings herein, some aspects are now introduced.

As discussed herein, the term "neural network" generally refers to software that implements statistical learning algorithms that are of an adaptive nature and are useful in machine learning. The neural network may include a plurality of artificial nodes, known as "neurons," "processing elements," "units," or by other similar terms and which are connected together to form a network which mimics a biological neural network. Generally, a neural network includes sets of adaptive weights (i.e. numerical parameters that are tuned by a learning algorithm), and are capable of approximating non-linear functions of their inputs. The adaptive weights are conceptually connection strengths between neurons, which are activated during training and prediction. Generally, a neural network operates on a principle of non-linear, distributed, parallel and local processing and adaptation. Generally, the first layer is called the "input layer," and the neurons within the layer are called input neurons. The "output layer" contains output neurons. Intermediate layers are called "hidden layers," since the neurons in these layer are neither inputs nor outputs. Neurons may include feature detectors, gradients, and other such components.

In general, "convolution" is a mathematical operation on two functions, f and g, and produces a third function that may be viewed as a modified version of one of the original functions. The third function generally includes area overlap between the two functions as a function of the amount that one of the original functions is translated.

In general, the term "convolutional neural network (CNN)" refers to a type of neural network where the individual neurons are tiled in such a way that they respond to overlapping regions in the visual field. Generally, the convolutional neural network (CNN) will employ local receptive fields, shared weights, and pooling to process imagery. Local receptive fields may be considered as connections of input pixels to a layer of hidden neurons. As an example, each neuron in the first hidden layer corresponds to a small, localized region of the input image. The region of the input image that corresponds to the hidden neuron is called the "local receptive field" for that hidden neuron. Each of the hidden neurons in the first hidden layer use the same weights and bias as the other hidden neurons, and thus have "shared weights." This means that all the neurons in the first hidden layer detect exactly the same feature just in different locations. The resulting map from the input layer is referred to as a "feature map," and the weights defining the feature map as the "shared weights." "Pooling layers" are usually used immediately after convolutional layers. Pooling layers simplify the information in the output from the convolutional layer. That is, a pooling layer takes each feature map output from the convolutional layer and prepares a condensed feature map. One common procedure for pooling is known as "max-pooling." In max-pooling, a pooling unit simply outputs the maximum activation of the input region (output from the feature map).

The deep convolution neural network (CNN) can be described as stacks of convolution layers, interlaced with normalization layer, pooling layer (which down samples the input spatially) and/or layers of other types, with fully connected layers and cost layers (e.g., logistic regression) in the top. Each convolution layer is parameterized by a set of filters, for example, a filter in the first layer which takes an RGB image as input and provides a response. The power of the deep CNN comes from the deeply stacked layers, which starts with simple features (for example, raw RGB image data) and learns more and more complex feature through the layers, where subsequent layers can be used to identify high level semantics.

As discussed herein, the term "filter" or "kernel" generally refers to a layer of connection weights. When using an image as input to the filter, the input includes a small two-dimensional image patch, and the output is then a single unit. Since the filter is applied repeatedly, the resulting connectivity looks like a series of overlapping receptive fields.

As discussed herein, the term "feature detector" generally refers to a set of techniques that learn a transformation of data input and provide a representation that can be used by the neural network.

As discussed herein, the term "subsampling," or "downsampling," generally refers to reducing the overall size of a signal. In the case of two-dimensional filter outputs, such as used for image processing, subsampling can also be thought of as increasing the position invariance of the filters. One technique referred to as "max pooling," involves taking the maximum value in each grid as the value in the reduced matrix. Semantically, this corresponds to changing the question answered by the convolution layer from "how well does this filter apply right here" to "how well does this filter apply to this area." By applying such a max pooling layer in between convolutional layers, spatial abstractness can be increased along with increases in feature abstractness.

As discussed herein, the term "image" refers to a two-dimensional array of digitized image data, however, this is merely illustrative and is not limiting. As discussed herein, images provided to the server may be collected by another device such as a remote input device (such as a camera incorporated into a mobile device) and prepared for training by intermediate tools (such as a software client) and configured to mimic the form of images provided by the client (for example). Images collected by the client may be provided in a digitized form (such as from a camera in the mobile device). In exemplary embodiments, aspects such as dimensions and number of pixels of training images are generally equivalent to the dimensions and number of pixels of production images. Further, merely for purposes of distinguishing training images from other images collected during operation of the client, images used for training the neural network are referred to as "training images." Images collected by the imaging device for subsequent analysis by a given neural network are referred to as "production images" and by other similarly distinct terms.

As discussed herein, the term "production" generally refers to use of a neural network to analyze input data. In contrast, "training" generally refers to sequences involved in developing the neural network for production.

As discussed herein, an "object" or "feature" may appear in or be contained within an image. For example, a car (object) may appear within a picture (image) of a landscape (collection of objects). An example of the feature may include a line, a curve, and intensity, color, and other particular properties of within an image. In some embodiments, the terms object and feature are interchangeable, and generally synonymous.

As discussed herein, the term "server" generally refers to a computing resource that has robust computational resources. Exemplary resources include those important for performing tasks described herein, and may include substantial memory, processing capabilities, data storage and the like. In exemplary embodiments, the server includes a conventional server (such as a blade server) a mainframe, a network of personal computers, or simply a personal computer (PC). A server may be remote from another device, such as a mobile device used for input. One example of an input device is a smartphone.

As discussed herein, the term "mobile device" generally refers to the computing resource that is configured for mobile use. Quite often, a device that is configured as a mobile device will have a reduced set of computational resources. Accordingly, various embodiments of mobile devices may maintain communication with a server to supplement computing capabilities. Examples of mobile devices include: a smart phone, a tablet computer, and/or a specialized device.

As discussed herein, the term "imaging device" generally refers to a device provided with an imaging sensor that may have a reduced set of computational resources. Exemplary resources include those important for performing tasks described herein, and may include a minimal amount of memory, processing capabilities, data storage and the like. In some embodiments, the imaging device includes imaging capabilities to provide for collection of input images that are input into the neural network. In some embodiments, the imaging device is configured for use on a mobile device and communicates with more robust, complimentary resources that operate on a remote server.

As discussed herein, the terms "program," "software," "application," "add-in," and other similar terms refer to machine executable instructions stored on non-transitory machine readable media. The machine executable instructions provide for execution of a method through control of computing resources and any associated components deemed appropriate.

As discussed herein, the terms "video," "movie," and other similar terms generally refer to a series of images.

As discussed herein, the terms "typical," or "conventional," when used to introduce an image signal processor, where reference is generally made to a dedicated graphics processing unit or chipset which has been programmed or otherwise configured for image signal processing.

As discussed herein, the term "image signal processing" generally refers to adjusting aspects of raw image data to improve the visual appearance of an output image. A variety of image quality attributes may be manipulated during image signal processing. For example, the image quality attributes that may be adjusted include: image size, aspect ratio, brightness, intensity, bit depth, white values, dynamic range, gray levels, contouring, smoothing, speckle (for example, as may be found in medical imaging), color space values, interleaving, correction, gamma correction, edge enhancement, contrast enhancement, sharpness, demosaicing and other aspects of digital imagery as may be deemed appropriate. A demosaicing (also "debayering") algorithm is a digital image process used to reconstruct a full color image from the incomplete color samples output from an image sensor overlaid with a color filter array (CFA). It is also known as CFA interpolation or color reconstruction.

In the exemplary embodiments, the methods and apparatus disclosed herein are useful for training a neural network. The neural network is configured by training with a set of reference image data. However, the exemplary embodiments are to be considered as merely illustrative and are not limiting of the teachings herein. Accordingly, the methods and apparatus disclosed may be used equally well for other applications involving use of neural networks.

Referring now to FIG. 1, aspects of an illustrative and non-limiting embodiment of a computing system 100 are depicted. In this example, computing system 100 includes a server 130. The server 130 has one or more central processing units (processors) 101a, 101b, 101c, etc. (collectively or generically referred to as processor(s) 101). Processors 101 are coupled to random access memory (RAM) 140 (also referred to "system memory," or simply as "memory") and various other components via a system bus 113. The computing system 100 may include read only memory (ROM) 141 coupled to the system bus 113. The ROM 141 may include a built-in operating system (BIOS), which controls certain basic functions of computer 100.

FIG. 1 further depicts an input/output (I/O) adapter 107 and a communications adapter 106 coupled to the system bus 113. I/O adapter 107 may include parallel ATA (PATA, also called IDE or EIDE), Serial ATA (SATA), SCSI, Serial Attached SCSI (SAS), and Fibre Channel, or include any other type of interface deemed appropriate. The I/O adapter 107 generally provides for communicating with a hard disk 103 and/or long term storage unit 105 (such as a tape drive) or any other similar component (such as an optical drive). I/O adapter 107, hard disk 103, and long term storage unit 105 (and other similar components as may be included) are collectively referred to herein as mass storage 104.

A communications adapter 106 interconnects system bus 113 with an outside network 150 enabling server 130 to communicate with other systems. The communications adapter 106 may be supportive of at least of one of wired and wireless communication protocols. For example, the communications adapter 106 may support protocols such as wired Ethernet, wi-fi (e.g., 802.11 protocols), UMTS, dial-up, active-sync, cellular (using protocols such as, for example, GSM, GPRS, EDGE, CDMA, TDMA, 3G, 4G, and the like). Generally, the communications adapter 106 communicates with network 150, and may communicate (directly or indirectly) with the Internet 121.

The server 130 is powered by a suitable power supply 120. In some embodiments, the power supply 120 includes at least one transformer for receiving alternating current (AC) and transforming the AC into a suitable form of direct current (DC). In other embodiments, the power supply 120 includes at least one battery. The power supply may include appropriate circuitry for receiving and controlling various forms of input power.

Input/output devices are shown as connected to system bus 113 via user interface (UI) adapter 108. A keyboard 109, a pointing device 110 (e.g., a mouse), and speaker 111 may be included and interconnected to system bus 113 via user interface adapter 108. Other user interface components may be included as deemed appropriate.

A display adapter 112 connects display monitor 136 is connected to system bus 113. The display adapter 112 and/or display monitor may be configured with various components, such as a graphics adapter to improve the performance of graphics intensive applications, a video controller, a capacitive (i.e., touch screen) display, and the like. The display monitor 136 may be used to display user interface.

In some embodiments, adapters 106, 107, 108 and 112 may be connected to one or more input/output (I/O) busses that are connected to system bus 113 via an intermediate bus bridge (not shown). Suitable I/O buses for connecting peripheral devices such as hard disk controllers, network adapters, and graphics adapters may include common protocols, such as the Peripheral Components Interface (PCI) bus.

Generally, the computing system 100 stores machine readable instructions on non-transitory machine readable media (such as in ROM, RAM, or in the mass storage unit 104). The machine readable instructions (which may be referred to herein as "software," as an "application," as a "client, a "process," a "plug-in" and by other similar terms) generally provide for functionality as will be discussed in detail further herein.

The computing system 100 may include additional components. The additional components may serve other functions as well. For example, the computing system 100 may take advantage of or rely upon a third-party communication system 151. For simplicity, the third-party communication system 151 is also referred to herein as a "system operator" 151. Additionally, the computing system 100 may include at least one imaging device 180. The at least one imaging device 180 may include a device such as a smartphone 182. Illustrative embodiments of smartphone 182 devices include the IPHONE from Apple Corp. of Cupertino, Calif., devices operating on the ANDROID platform of Google Corp. of Mountain View, Calif., as well as devices operating in the WINDOWS environment provided by Microsoft Corp. of Redmond, Wash. Other embodiments of the imaging device 180 include a camera 181.

In illustrative embodiments, the at least one mobile device 180 includes components similar to those found in the server 130. For example, the at least one imaging device 180 includes at least one central processing unit (CPU). The central processing unit (CPU) is connected to or in communication with other components through an internal system bus. Examples of other components within the imaging device 180 include a power supply, memory, software, user controls, a display, a front facing sensor and/or a rear facing sensor, a lamp, and a communication interface.

The CPU may be an ARM or other processor. The power supply may be from a battery or a source of direct current (DC), such as a transformer coupled to a conventional alternating current (AC) outlet. User controls may include a home button and an on/off switch. The display may include at least one of LCD, LED, OLED, AMOLED, IPS and other technologies. Lamp may be a light emitting diode (LED).

The communication interface (not indicated) may include a wired interface and/or a wireless interface. The wireless interface may include a wireless service processor. Illustrative wireless interfaces may make use of a protocol such as cellular, Bluetooth, Wi-Fi, near field technology (NFC), ZigBee, or other technology. Communication services provided over the wireless communication interface may include Wi-Fi, Bluetooth, Ethernet, DSL, LTE, PCS, 2G, 3G, 4G, LAN, CDMA, TDMA, GSM, WDM and WLAN. The communication interface may include an auditory channel. That is, the communication interface may include a microphone for receiving voice commands, and may further include a speaker. In some embodiments, the speaker may provide an auditory signal when a barcode has been read. The communication interface may further include a status light or other such visual indicators.

The communication interface provides for, among other things, voice communications as well as data communications. The data communications may be used to provide for communication of software and data (such as at least one image; results of analyses, and other such types of data). Communication through the communication interface may be bi-directional or in a single direction.

The imaging device 180 may include additional components such as environmental sensors. Examples of environmental sensors may include an accelerometer that provides for orientation information and a GPS sensor that provides for location information. The imaging device 180 may also include peripheral interface and communication ports.

In some embodiments of the server 130, the machine readable instructions stored therein include drivers configured for communicating with other components. For example, the drivers may enable the server 130 to communicate with the camera and/or environmental sensors of the imaging device 180.

Some of the machine readable instructions stored on non-transitory machine readable media may include an operating environment. For example, and as presented herein, a suitable operating environment is WINDOWS (available from Microsoft Corporation of Redmond Wash.). Software as provided herein may be developed in, for example, SQL language, which is a cross-vendor query language for managing relational databases. Aspects of the software may be implemented with other software. For example, user interfaces may be provided in XML, HTML and the like.

The computing system 100 may include, or exclude, as appropriate, the foregoing components and other components. For example, other components such as routers, bridges, firewalls, switches, other servers, middleware and other components may be available. Some components may be implemented in software and/or hardware. In some embodiments, the term "server" refers to a software engine running on hardware that may perform other functions as well.

The computing system 100 may include a plurality of computers. For example, in the computing system 100, at least one computer in the plurality may include substantial storage, memory, processors, mass storage and the like. Other devices, such as imaging device 180 may include a reduced set of components. At least one computer in the plurality may be designed with mobility as a primary purpose. For example, memory may replace a hard disk due to a physically compact nature of the memory. Other embodiments of the imaging device 180 include a tablet computer, a scanner, and anyone of a number of specialized devices. Non-limiting examples of specialized devices include application-specific devices designed for machine vision.

A particular computer in the computing system 100 may be purpose-oriented. For example, a computing infrastructure may use one computer principally as a file server (i.e., a data storage device for efficient storing of data within the computing infrastructure), a plurality of other computers as input devices (e.g., as mobile stations operated remotely by users for interfacing with the computing infrastructure), as a console (e.g., a dedicated system for managing the computing infrastructure), and the like.

It should be recognized that some functionality as may be described herein may be implemented by hardware (such as by the foregoing components), or by software, as appropriate. Accordingly, where reference is made to implementation in one manner or another, such implementation is merely illustrative and is not limiting of techniques described. In short, the foregoing description of the computing system 100, and systems making use of the computing system 100, merely provide an environment for the teachings herein and is not to be construed as limiting, but as illustrative of aspects of the computing system 100.

Generally, the computing system 100 implements a software solution that enables users to train and/or operate neural network systems. The computing system 100 may implement third party software systems for various purposes, such as communications, messaging, graphics editing, statistical analyses, and for other such purposes.

Figure 2:
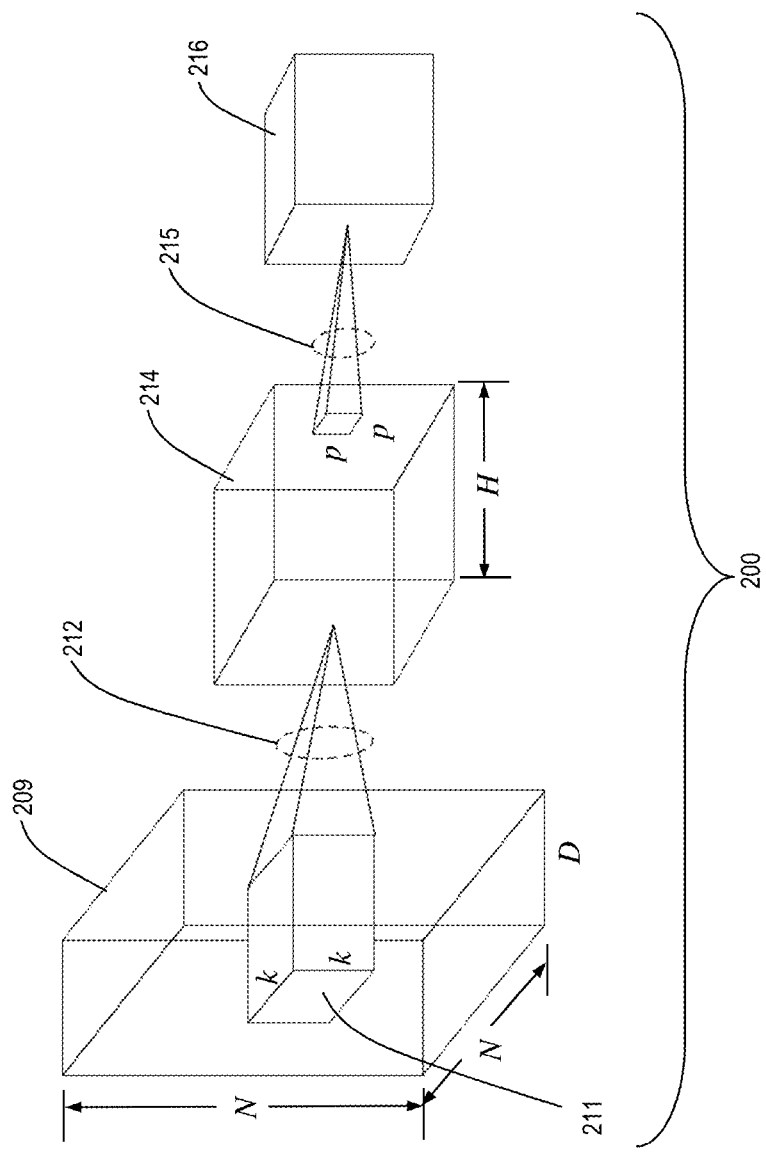
FIG. 2 is diagram depicting generalized aspects of a neural network.

FIG. 2 is a schematic diagram that is an abstraction for all illustrating basic aspects of a convolutional neural network (CNN) 200 useful for development of feature detectors and/or for decision making regarding identification of objects. The convolutional neural network (CNN) 200 may be provided as software, such as software that is stored in mass storage unit 104 of the server 130 and/or in data storage of the at least one mobile device 180. The convolutional neural network (CNN) 200 may be built using any application deemed appropriate. One application suited for coding the convolutional neural network (CNN) 200 is Python, which is open source software available from the Python Software Foundation of Beaverton, Oreg. As aspects of computer programming and coding are known, the mechanics of assembling the convolutional neural network (CNN) 200 are generally not discussed herein. Rather, aspects of the convolutional neural network (CNN) 200 are presented in functional terms understandable to one skilled in the art.

In this exemplary embodiment, and to provide some context, the convolutional neural network (CNN) 200 includes an input feature map 209, a convolution output layer 214, and a pooling layer 216. In this example, the input feature map 209 includes a three-dimensional input volume. The input feature map 209 is characterized by dimensions of N×N×D, where N represents height and width of the input, and D, represents depth of the input (for example, a number of hidden layers associated with the input feature map 209). A plurality of filters 211 are used to filter the input feature map 209. Each filter 211 is characterized by dimensions of k×k×D, where the additional variable, k, represents height and width of each filter 211. In this example, the height and the width of the input feature map 209 as well as each filter 211 are equivalent, and therefore the respective components are square. However, this is merely for simplicity and it should be recognized that the input feature map 209 and/or the filter 211 may be rectangular (and therefore the width may differ from the height for each of the respective components).

In operation of the convolutional neural network (CNN) 200, each filter 211 is shifted in a sliding window like fashion across the input feature map 209. The amount of shift is referred to as the "stride length," or simply as the "stride," s. During each shift, respective weighting belonging to a given filter 211 is multiplied and added with every pair-wise input element from the overlapping region of the input volume to provide convolution 212. After convolution 212, optional pooling layer 216 is used to subsample the convolved output by sliding a two-dimensional window across the three-dimensional convolved output and selecting the maximum (or average) value 215 over the window. In this example, the optional pooling layer 216 is defined by parameters p and s, where p×p defined the region for the pooling operation, and s represents the stride for the filter 211.

Figure 3:
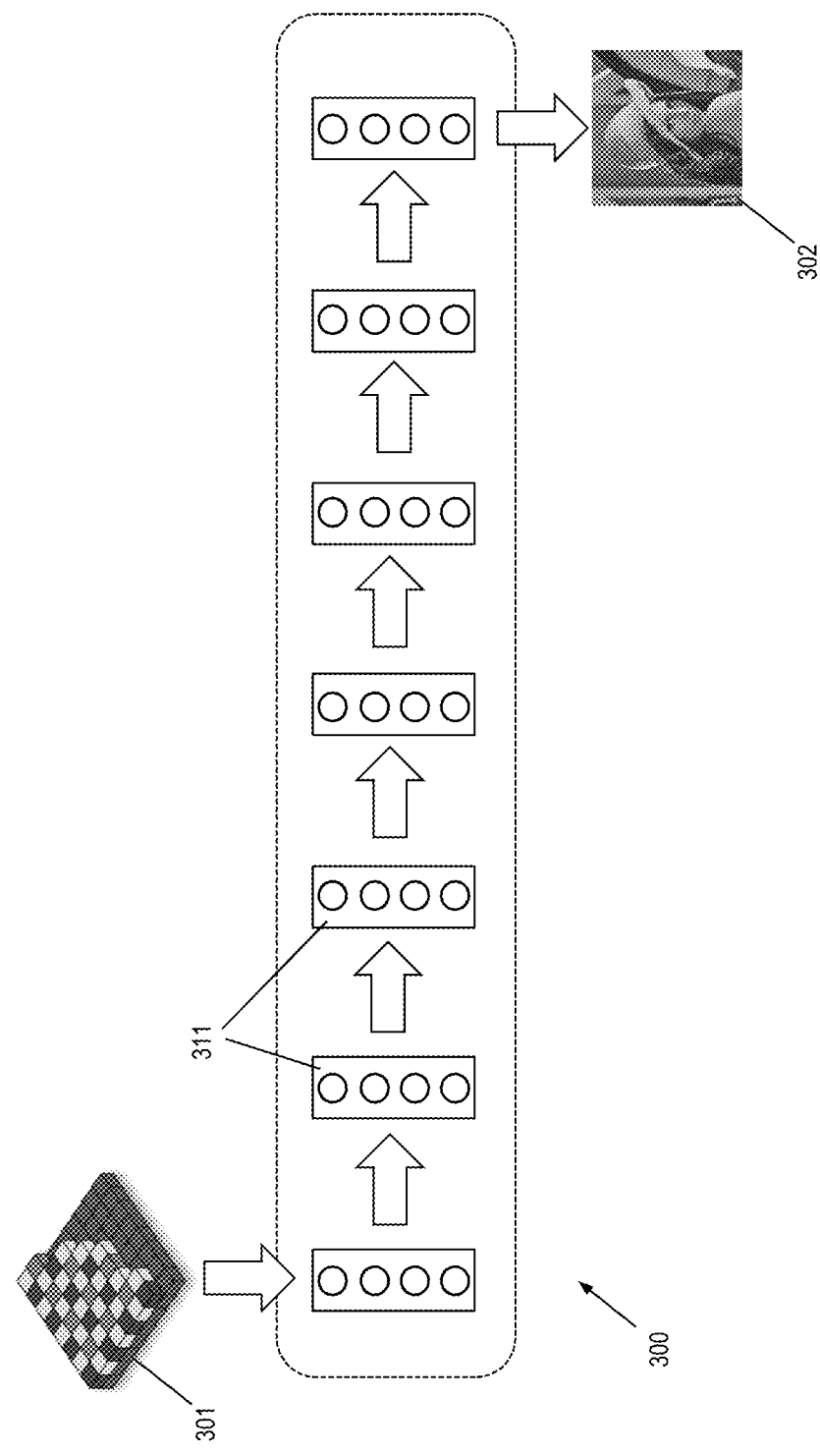
FIG. 3 is diagram depicting aspects of implementation of a neural network for image signal processing.
Figure 4:
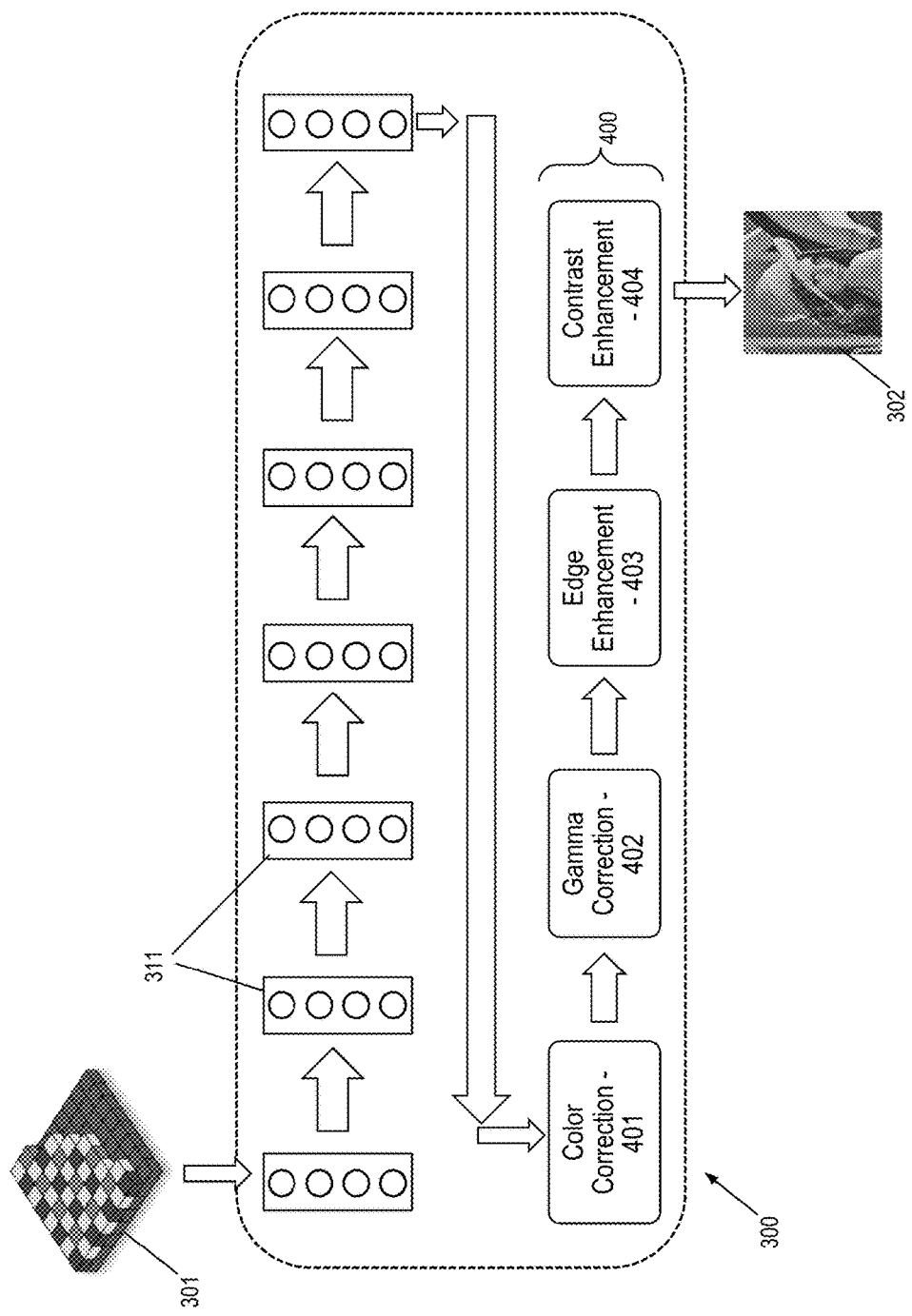
FIG. 4 is another diagram depicting aspects of implementation of a neural network for image signal processing.

Turning now to FIG. 3 and FIG. 4, aspects of an example of an image signal processing (ISP) neural network 300 are shown. FIG. 3 provides a conceptual view of the image signal processing (ISP) neural network 300. In this example, the image signal processing (ISP) neural network 300 receives input image data 301 and provides processed output 302. In this example, the input image data 301 includes a Bayer pattern. The processed output 302 is provided by the trained image signal processing (ISP) neural network 300. The image signal processing (ISP) neural network 300 includes a plurality of processing filters 311. As shown in FIG. 4, the image signal processing (ISP) neural network 300 provides a replacement of subset of the image signal processing. In this example, the remaining stages of the image signal processing are kept, including color correction 401, gamma correction 402, edge enhancement 403, and contrast enhancement 404.

Figure 5:
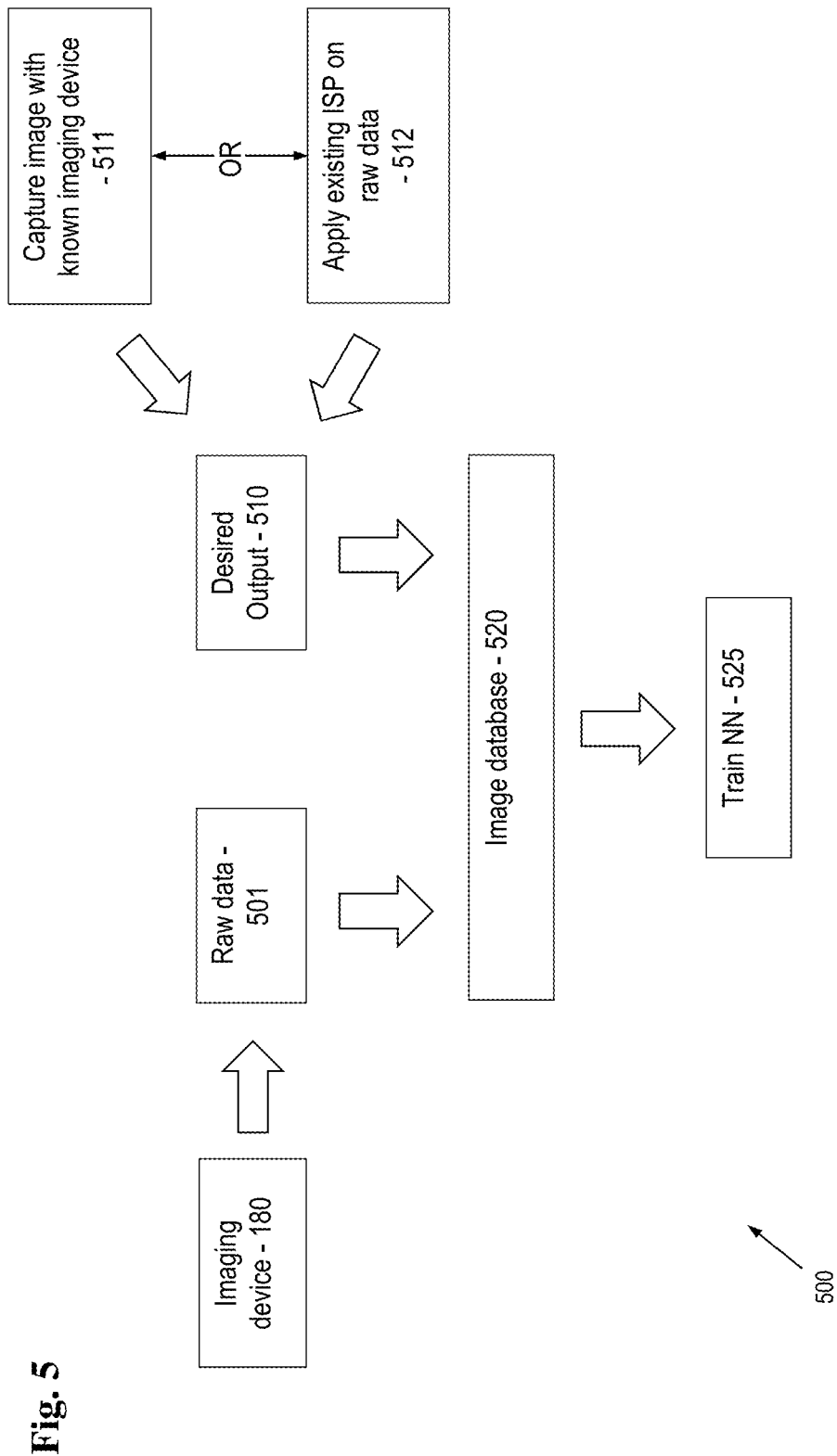
FIG. 5 is a diagram depicting aspects of an exemplary process for training a neural network to perform image signal processing.

Referring now to FIG. 5, aspects of an exemplary embodiment for training of image signal processing 500 are shown. In the exemplary embodiment, a particular imaging device 180 is used to collect a plurality of images. The plurality of images are provided as raw data image 501. Each raw data image 501 is correlated with a desired quality output image 510 that depicts the same imagery. Generally, the desired quality output image 510 may be one of a reference image 511 and a conventionally processed image 512.

In general, the desired quality output image 510 is used in training of the neural network, while the processed output 302 may be referred to as a "production" image (that is, the product of a trained neural network).

A reference image 511 may be obtained by, for example, imaging with a reference device such as a state-of-the-art camera. In some embodiments, each reference image 511 may additionally include attribute reference data. In some embodiments, the attribute reference data may be used in the training of the neural network. The conventionally processed image 512 may be processed by processing raw data images 501 with a reference image processing technique. Collectively, a set of raw data images 501 that is correlated with a set of desired quality output images 510 is used as training data and loaded into image database 520. Training data stored in the image database 520 is then used for training 525. Training 525 may be accomplished using various training algorithms. For example, back propagation may be used for training of the image signal processing (ISP) neural network 300.

In order to demonstrate the efficacy of this method, the convolutional neural network was trained and used for image generation. Training data was selected from a public data set (the Microsoft Research demosaic data set). Images and the corresponding RGB images from a three camera model where used. Both noisy images and noise free images were used. Patches of 32×32 were extracted (without overlap) from each image to form the input and output. About 10,000 pairs of images were used for training, and about 5,000 pairs of images were used for testing. Configuration of the neural network used for verification of the techniques disclosed herein is depicted in FIG. 6.

Figure 6:
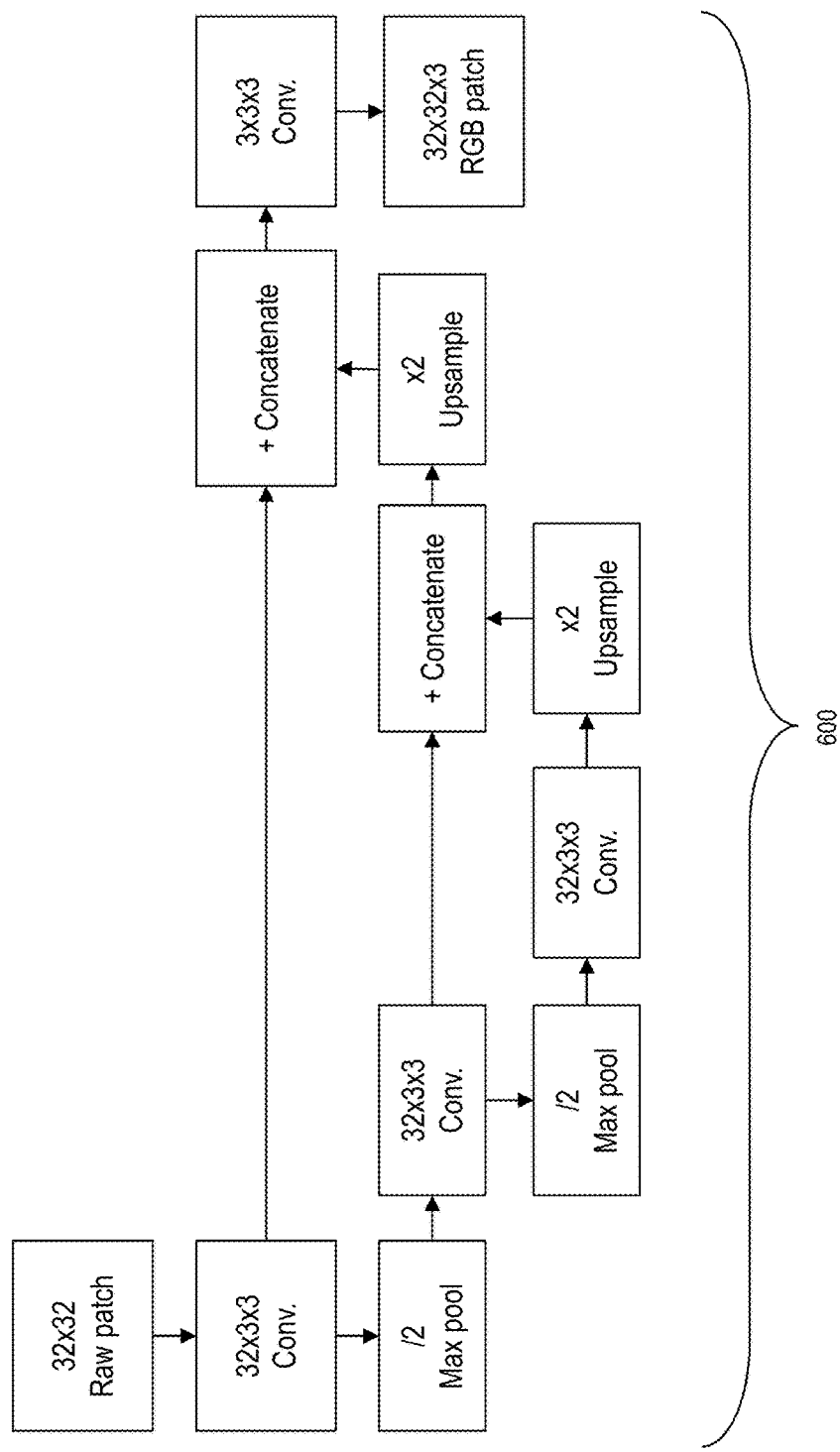
FIG. 6 is an illustration of an example of a neural network for image signal processing.
Figure 7A:
Figure 7B:
Figure 7D:
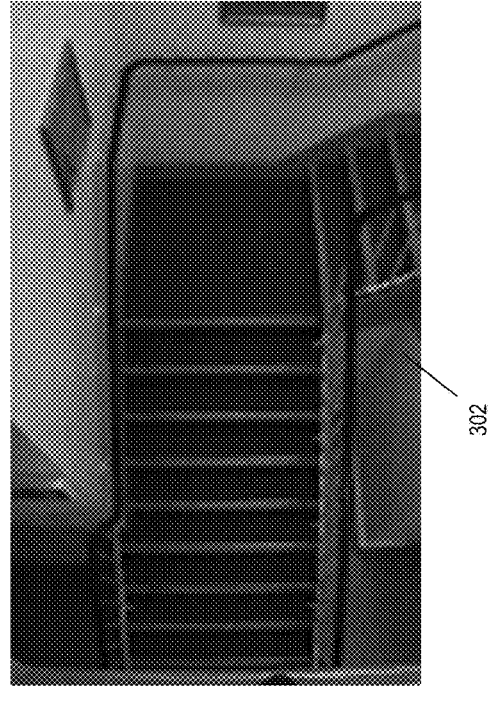
Figure 7C:
Figure 8A:
Figure 8B:
Figure 8C:
Figure 8D:
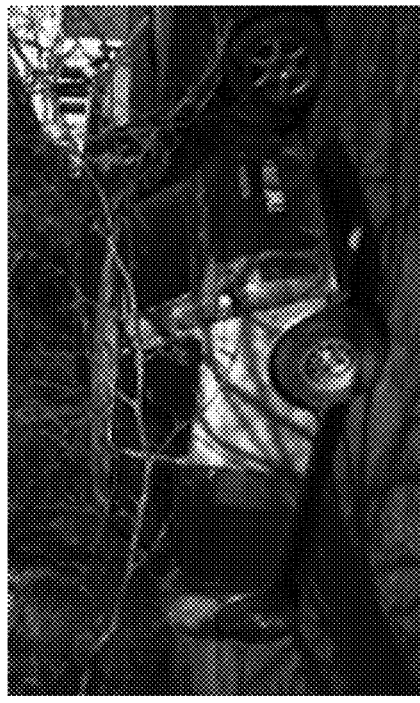

In FIG. 6, aspects of a multiscale image processing neural network 600 is shown. The multiscale image processing neural network 600 is configured with three scales to separate different frequency bands. Multiple 3×3 filters were used. The mean square error function was used as the cost function.

In verification, the peak signal to noise ratio (PSNR) and the structural similarity index measure (SSIM) for a noisy Panasonic dataset were calculated. The PSNR was determined to be 36.0234 and the SSIM was determined as 0.8958. In contrast, the state of art method (Joint Demosaicing and Denoising via Learned Nonparametric Random Fields) reports PSNR of 36.9137 and SSIM of 0.8904. Adaptive Homogeneity-Directed Demosaicing (AHD) provided PSNR of 34.3756 and SSIM of 0.8593. Thus, verification demonstrated that use of a neural network for image signal processing (ISP) is effective, and in most cases superior, technique for performing image signal processing.

In FIGS. 7 and 8, comparisons of graphic images are provided. The A image of each group presents the raw image data 301 (FIG. 7A, FIG. 8A). The B image of each group presents the desired quality output image 510 (FIG. 7B, FIG. 8B). The C image of each group presents the conventionally processed image 512 (FIG. 7C, FIG. 8C). The D image of each group presents the processed output 302 (FIG. 7D, FIG. 8D).

Figure 9B:
FIG. 9B depicts output of the neural network configured for image signal processing.
Figure 9A:
FIG. 9A depicts output of the state of the art image signal processor.

Referring now to FIG. 9, a close up view of two of the images from FIG. 8 are shown. In FIG. 9A, a portion of the conventionally processed image 512 is shown. In FIG. 9B, a portion of the conventionally processed image 512 that correlates to FIG. 9A is shown. It may be seen that, among other things, the image depicted in FIG. 9B is sharper, and less pixilated.

Having thus introduced aspects of an image signal processing (ISP) neural network, some additional features and embodiments are presented.

Advantageously, the image signal processing (ISP) neural network may be updated whenever desired. For example, if the imaging device 180 is reconfigured with new hardware, such as a new camera lens, it may be appropriate to retrain the image signal processing (ISP) neural network to account for improved optics. In some embodiments, this update may be referred to as "retraining" or "calibration" of the imaging device 180. The update may include a smaller set of training data, if desired. Among other things, various performance measures may be tracked. If a particular performance measure reflects poor performance, complete re-training may be suggested.

In some embodiments, the imaging device 180 communicates with a remote system such as the server 130 to perform training, after which operative aspects of the image signal processing (ISP) neural network are downloaded to the imaging device 180. Accordingly, in some embodiments, it is possible to train the image signal processing (ISP) neural network by making use of remote resources, while the image signal processing (ISP) neural network is operated locally using the resources on board the imaging device 180. Other models for distributed computing may be employed.

As described above, the image signal processing (ISP) neural network may be provided as machine executable instructions stored on machine readable media, and configured for executing the techniques described herein. The image signal processing (ISP) neural network may complement, or take the place of, a conventional image signal processing components such as a graphics processing chipset.

The image signal processing (ISP) neural network may be reconfigured via communicating with a remote system, for example, a server. The reconfiguration can be done automatically, for example, according to geography of the product. The reconfiguration can be done according to the customer's preference.

For example, in some embodiments, the image signal processing (ISP) neural network may be used in a conventional imaging device 180, where output of the imaging device 180 is used as raw data input 301 for the image signal processing (ISP) neural network. In some other embodiments, software loaded into the conventional imaging device 180 turns off an existing graphics processing chipset and installs the image signal processing (ISP) neural network to perform image signal processing tasks.

The image signal processing (ISP) neural network may be purpose oriented. For example, the image signal processing (ISP) neural network may include a system that is dedicated to a given purpose such as, for example, medical imaging. More specifically, and by way of example only, the image signal processing (ISP) neural network may be dedicated to processing images associated with ultrasonic imaging, CT scan imaging, medical resonance imaging (MRI), x-ray imaging, output from a gamma camera and other sorts of medical imaging.

Similarly, the image signal processing (ISP) neural network may be dedicated to other purposes. For example, and by way of example only, the image signal processing (ISP) neural network may be dedicated to security tasks such as facial recognition. The image signal processing (ISP) neural network may be dedicated to production oriented tasks, such as machine vision. Machine vision may be required, among other things, for mail-sorting (i.e., handwriting analysis) and other such tasks.

Various other components may be included and called upon for providing for aspects of the teachings herein. For example, additional materials, combinations of materials and/or omission of materials may be used to provide for added embodiments that are within the scope of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. The term "exemplary" is intended to refer to one of many possible examples, and is not to be construed as necessarily referring to a superlative or best embodiment. However, in some cases, the exemplary embodiment may indeed be representative of a superlative or best embodiment.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An image signal processing (ISP) system, comprising:
   a neural network that receives an input image and outputs a processed image, the input image including input image data, the neural network comprising a convolutional neural network having multiple parallel paths in which each path scales the input image data to separate the input image data into separate frequency bands of spatial resolution, a first path comprising a first convolutional layer having an output at a first frequency band of spatial resolution, the output of the first convolutional layer being pooled at a second frequency band of spatial resolution that is less than the first frequency band of spatial resolution, a second path being coupled to the pooled output of the first convolutional layer and comprising a second convolutional layer having an output at the second frequency band of spatial resolution, the output of the second convolutional layer being pooled at a third frequency band of spatial resolution that is less than the second frequency band of spatial resolution, a third path being coupled to the pooled output of the second convolutional layer and comprising a third convolutional layer having an output at the third frequency band of spatial resolution, an output of the third convolutional layer being upsampled to the second frequency band of spatial resolution and concatenated with the output of the second convolutional layer to form a first intermediate output, the first intermediate output being upsampled to the first frequency band of spatial resolution and concatenated with the output of the first convolutional layer to form a second intermediate output, the second intermediate output being input to a fourth convolutional layer to output the processed image, and the neural network adjusting the input image data for at least one image-quality attribute to generate the processed image; and
   an image-processing chain that receives the processed image output from the neural network, the image-processing chain providing at least one of color correction, gamma correction, edge enhancement and contrast enhancement of the processed image to output a final image,
   wherein the at least one adjusted image-quality attribute comprises an image size, an aspect ratio, a brightness, an intensity, a bit depth, a white value, a dynamic range, a gray level, a contouring, a smoothing, a speckle, a color space values, an interleaving, a gamma correction, a contrast enhancement, a sharpness and a demosaicing.

2. The image signal processing (ISP) system as in claim 1, wherein the neural network has been trained by a back-propagation technique.

3. The image signal processing (ISP) system as in claim 1, wherein the processed image includes at least one detected feature comprising at least one of a line, a curve, an intensity and a color within the input image.

4. The image signal processing (ISP) as in claim 1, wherein the convolutional neural network comprises three parallel paths.

5. The image signal processing (ISP) system as in claim 1, wherein the input image includes noise,
   wherein the neural network includes a plurality of layers,
   wherein the neural network includes a plurality of filters each having dimensions that are different from each other,
   wherein a height and a width of each respective filter is different from other filters,
   wherein the neural network includes a pooling layer, and
   wherein a filter is shifted across a predetermined layer of the neural network by a predetermined stride s.

6. A method for providing an image signal processing (ISP) system, the method comprising:
   inputting an input image into a neural network, the input image comprising input image data, and the neural network comprising a convolutional neural network having multiple parallel paths in which each path scales the input image data to separate the input image data into multiple separate frequency bands of spatial resolution, a first path comprising a first convolutional layer having an output at a first frequency band of spatial resolution, the output of the first convolutional layer being pooled at a second frequency band of spatial resolution that is less than the first frequency band of spatial resolution, a second path being coupled to the pooled output of the first convolutional layer and comprising a second convolutional layer having an output at the second frequency band of spatial resolution, the output of the second convolutional layer being pooled at a third frequency band of spatial resolution that is less than the second frequency band of spatial resolution, a third path being coupled to the pooled output of the second convolutional layer and comprising a third convolutional layer having an output at the third frequency band of spatial resolution, an output of the third convolutional layer being upsampled to the second frequency band of spatial resolution and concatenated with the output of the second convolutional layer to form a first intermediate output, the first intermediate output being upsampled to the first frequency band of spatial resolution and concatenated with the output of the first convolutional layer to form a second intermediate output, the second intermediate output being input to a fourth convolutional layer to output the processed image;

adjusting the input image by the neural network to output a processed image having input image data adjusted for at least one image-quality attribute; and, generating by an image-processing chain a final image from the processed image, the image-processing chain processing at least one of a color correction, a gamma correction, an edge enhancement and a contrast enhancement of the processed image, wherein the at least one adjusted image-quality attribute comprises an image size, an aspect ratio, a brightness, an intensity, a bit depth, a white value, a dynamic range, a gray level, a contouring, a smoothing, a speckle, a color space values, an interleaving, a gamma correction, a contrast enhancement, a sharpness and a demosaicing.

7. The method as in claim 6, further comprising training the neural network by back-propagation.

8. The method as in claim 6, further comprising generating the input image using an imaging device.

9. The method as in claim 6, wherein the processed image includes at least one detected feature comprising at least one of a line, a curve, an intensity and a color within the input image.

10. The method as in claim 6, wherein the input image data includes noise, wherein the neural network includes a plurality of layers,
wherein the neural network includes three parallel paths,
wherein the neural network includes a plurality of filters each having dimensions that are different from each other,
wherein a height and a width of each respective filter is different from other filters,
wherein the neural network includes a pooling layer, and
wherein a filter is shifted across a predetermined layer of the neural network by a predetermined stride s.

11. An imaging device, comprising:

an imaging sensor that outputs raw image data; and
an image signal processing (ISP) system comprising a convolutional neural network and an image-processing chain, the convolutional neural network comprising multiple parallel paths in which each path scales the raw image data to separate the raw image data into separate frequency bands of spatial resolution, a first path comprising a first convolutional layer having an output at a first frequency band of spatial resolution, the output of the first convolutional layer being pooled at a second frequency band of spatial resolution that is less than the first frequency band of spatial resolution, a second path being coupled to the pooled output of the first convolutional layer and comprising a second convolutional layer having an output at the second frequency band of spatial resolution, the output of the second convolutional layer being pooled at a third frequency band of spatial resolution that is less than the second frequency band of spatial resolution, a third path being coupled to the pooled output of the second convolutional layer and comprising a third convolutional layer having an output at the third frequency band of spatial resolution, an output of the third convolutional layer being upsampled to the second frequency band of spatial resolution and concatenated with the output of the second convolutional layer to form a first intermediate output, the first intermediate output being upsampled to the first frequency band of spatial resolution and concatenated with the output of the first convolutional layer to form a second intermediate output, the second intermediate output being input to a fourth convolutional layer to output the processed image, the convolutional neural network to receive the raw image data from the imaging sensor and to adjust the raw image data to output a processed image in which the raw image data has been adjusted for at least one image-quality attribute, and the image-processing chain to output a final image, the image-processing chain comprising at least one of a color correction, a gamma correction, an edge enhancement and a contrast enhancement of the processed image, wherein the at least one adjusted image-quality attribute comprises an image size, an aspect ratio, a brightness, an intensity, a bit depth, a white value, a dynamic range, a gray level, a contouring, a smoothing, a speckle, a color space values, an interleaving, a gamma correction, a contrast enhancement, a sharpness and a demosaicing.

12. The imaging device as in claim 11, wherein the processed image includes at least one detected feature comprising at least one of a line, a curve, an intensity and a color within the raw image data.

13. The imaging device as in claim 11, wherein the raw image data includes noise, wherein the neural network includes a plurality of layers,
wherein the neural network includes three parallel paths,
wherein the neural network includes a plurality of filters each having dimensions that are different from each other,
wherein a height and a width of each respective filter is different from other filters,
wherein the neural network includes a pooling layer, and
wherein a filter is shifted across a predetermined layer of the neural network by a predetermined stride s.

* * * * *